United States Patent
Schumann

(10) Patent No.: US 11,479,137 B2
(45) Date of Patent: Oct. 25, 2022

(54) METHOD AND DEVICE FOR LOCATING A VEHICLE FOR AN INDUCTIVE ENERGY TRANSMISSION

(71) Applicant: Robert Bosch GmbH, Stuttgart (DE)

(72) Inventor: Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 440 days.

(21) Appl. No.: 16/607,442

(22) PCT Filed: May 9, 2018

(86) PCT No.: PCT/EP2018/062053
§ 371 (c)(1),
(2) Date: Oct. 23, 2019

(87) PCT Pub. No.: WO2018/219618
PCT Pub. Date: Dec. 6, 2018

(65) Prior Publication Data
US 2020/0130524 A1 Apr. 30, 2020

(30) Foreign Application Priority Data
May 31, 2017 (DE) .......................... 102017209092.8

(51) Int. Cl.
*H01F 27/42* (2006.01)
*H01F 37/00* (2006.01)
(Continued)

(52) U.S. Cl.
CPC ............... *B60L 53/38* (2019.02); *B60L 53/36* (2019.02); *G01S 5/22* (2013.01); *H02J 50/10* (2016.02); *H02J 50/90* (2016.02)

(58) Field of Classification Search
CPC .......... B60L 50/60; B60L 53/36; B60L 53/38; H02J 50/10; H02J 50/90; G01S 5/22
See application file for complete search history.

(56) References Cited

U.S. PATENT DOCUMENTS

| 2013/0241476 A1* | 9/2013 | Okada | G01N 21/94 |
| | | | 320/108 |
| 2014/0269212 A1* | 9/2014 | Xiang | G01S 5/30 |
| | | | 367/197 |

FOREIGN PATENT DOCUMENTS

| CN | 104269944 A | 1/2015 |
| DE | 102004018670 A1 | 8/2005 |

(Continued)

OTHER PUBLICATIONS

International Search Report for PCT/EP2018/062053, dated Jul. 26, 2018.

*Primary Examiner* — Rexford N Barnie
*Assistant Examiner* — Rasem Mourad
(74) *Attorney, Agent, or Firm* — Norton Rose Fulbright US LLP; Gerard Messina

(57) ABSTRACT

A device for locating a vehicle for an inductive energy transmission from an inductive charging device to the vehicle includes an ultrasound transmitter, which emits at least one first ultrasonic signal. At least three ultrasound receivers are situated on the vehicle, which receive an ultrasonic signal sequence having a direct receive signal and further receive signals in each case. A processing unit is situated on the vehicle, which is developed to ascertain the earliest receive direct receive signals within the ultrasonic signal sequences and to ascertain a position of the vehicle relative to the primary coil of the inductive charging device as a function of the ascertained direct receive signals.

12 Claims, 5 Drawing Sheets

(51) Int. Cl.
  *H01F 38/00*    (2006.01)
  *B60L 53/38*    (2019.01)
  *H02J 50/90*    (2016.01)
  *H02J 50/10*    (2016.01)
  *B60L 53/36*    (2019.01)
  *G01S 5/22*     (2006.01)

(56) References Cited

FOREIGN PATENT DOCUMENTS

| | | | |
|---|---|---|---|
| DE | 102012219986 A1 * | 6/2014 | ............ B60L 11/182 |
| DE | 102012219986 A1 | 6/2014 | |
| DE | 102014220247 A1 * | 4/2016 | .......... B60L 11/1827 |
| DE | 102014220247 A1 | 4/2016 | |
| JP | 2012249405 A | 12/2012 | |
| JP | 2015531064 A | 10/2015 | |
| JP | 2016116359 A | 6/2016 | |
| WO | 2015142475 A1 | 9/2015 | |

\* cited by examiner

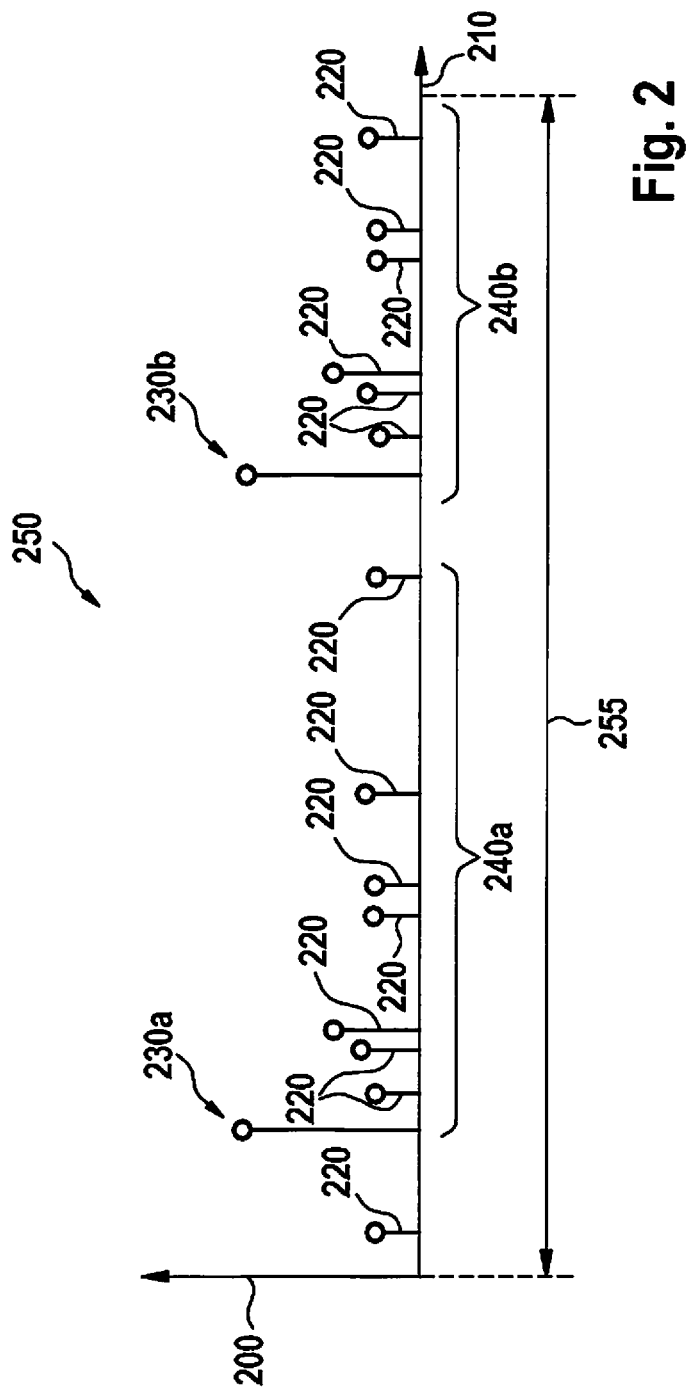

METHOD AND DEVICE FOR LOCATING A VEHICLE FOR AN INDUCTIVE ENERGY TRANSMISSION

FIELD

The present invention relates to a device and a method for locating a vehicle for an inductive energy transmission from an inductive charging device to the vehicle.

German Patent Application No. DE 10 2014 220 247 A1 describes an assistance system for an optimal positioning of the primary coil and secondary coil of an inductive charging device during the charging of an electric vehicle, in the process of which ultrasonic signals are exchanged between the primary coil and the secondary coil. The ultrasound source is situated in the vicinity of the primary coil and emits either uniformly in all directions in space or with a special radiation characteristic in specific directions in space.

It is an object of the present invention to provide a method and a device in which the locating of the vehicle in relation to the inductive charging station is optimized.

SUMMARY

An example device for locating a vehicle for an inductive energy transmission from an inductive charging device to the vehicle is provided according to the present invention. In addition, an example method for locating a vehicle for an inductive energy transmission from an inductive charging device to the vehicle is provided according to the present invention, the method being carried out by the device.

The example device for locating a vehicle for an inductive energy transmission from an inductive charging device to the vehicle in a near range includes at least one ultrasound transmitter, which is situated on a primary coil of the inductive charging device and developed to emit at least one ultrasonic signal. In addition, the device includes a first ultrasound receiver, which is situated on the vehicle and receives at least one first ultrasonic signal sequence in the near range. The first ultrasonic signal sequence includes at least one first direct receive signal. This signal, which is also called a direct propagator, corresponds to a direct transmission of the at least one ultrasonic signal from the first ultrasound transmitter to the first ultrasound receiver without any prior reflection of the signal at objects. In addition, the first ultrasonic signal sequence includes additional receive signals which correspond to an indirect transmission of the ultrasonic signal from the at least one ultrasound transmitter to the first ultrasound receiver in each case. Thus, this involves signals which are reflected once or multiple times at objects before they reach the first ultrasound transmitter.

In addition, the device also includes a second ultrasound receiver, which is situated on the vehicle and receives at least one second ultrasonic signal sequence in the near range. The second ultrasonic signal sequence includes a second direct receive signal, which corresponds to a direct transmission of the at least one ultrasound signal from the at least one ultrasound transmitter to the second ultrasound receiver. Moreover, the second ultrasonic signal sequence includes additional receive signals, which correspond to an indirect transmission of the first ultrasound signal from the at least one ultrasound transmitter to the second ultrasound receiver.

In addition, the device includes a third ultrasound receiver, which is situated on the vehicle and receives at least one third ultrasonic signal sequence in the near range. The third ultrasonic signal sequence includes a third direct receive signal, which corresponds to a direct transmission of the at least one ultrasonic signal from the first ultrasound transmitter to the third ultrasound receiver. Furthermore, the third ultrasonic signal sequence includes additional receive signals, which correspond to an indirect transmission of the first ultrasonic signal from the first ultrasound transmitter to the third ultrasound receiver. Thus, the near range correspondingly characterizes a region within which a reception of the first ultrasonic signal sequence by the first ultrasound receiver is possible, a reception of the second ultrasonic signal sequence by the second ultrasound receiver is possible, and the reception of a third ultrasonic signal sequence by the third ultrasound receiver is possible.

Also provided is a processing unit, which is developed to ascertain the earliest first direct receive signal within the first ultrasonic signal sequence, the earliest second direct receive signal within the second ultrasonic signal sequence, and the earliest third direct receive signal within the third ultrasonic signal sequence. The earliest direct receive signals are to be understood as the earliest received direct receive signals received earliest in terms of time inside a measuring window. The processing unit is additionally developed to ascertain a position of the vehicle in the near range as a function of the ascertained earliest direct receive signals, in particular the position of the secondary coil of the vehicle, relative to the primary coil of the inductive charging device. For example, the device has the advantage that the signal evaluation is optimized by differentiating between direct receive signals and indirect receive signals, which thus allows for the more precise locating of the vehicle relative to the inductive charging device.

The at least one ultrasound transmitter is preferably developed to emit the at least one ultrasonic signal uniformly in at least two, mutually opposed directions in space. It would therefore be possible, for instance, to locate the vehicle when it approaches the primary coil of the inductive charging device from the front or the back.

The at least one ultrasound transmitter is preferably developed to emit the at least one ultrasonic signal in a first transmission window, the duration of the measuring window being specified in terms of time. The first ultrasound receiver is once again developed to receive the first ultrasonic signal sequence in a first measuring window, the duration of the first measuring window being specified in terms of time. The second ultrasound receiver is developed to receive the second ultrasonic signal sequence in a second measuring window, and the third ultrasound receiver receives the third ultrasonic signal sequence in the third measuring window. The respective first, second and third measuring windows, whose durations are specified in terms of time, are preferably longer than the first transmission window in each case. It can therefore be ensured that a direct propagator is actually also able to be received in each measuring window. In this case, the ultrasound receivers are preferably developed to receive the respective ultrasonic signal sequences in mutually synchronized, time-specified measuring windows. The processing unit is designed to ascertain the position of the vehicle relative to the primary coil of the inductive charging device as a function of propagation time differences of the ascertained direct receive signals relative to one another. In other words, the processing unit checks in which time sequence the ultrasound receivers have received the direct receive signal. For instance, if the earliest first direct receive signal was received later than the earliest second direct receive signal, then it may be inferred therefrom that the ultrasound transmitter is located at a greater distance from the first ultrasound receiver than from the second ultrasound receiver. Here, a hyperbola with the two ultrasound receivers as the focal point characterizes all points that are the same for the amount of the difference of the distances to the first ultrasound receiver and the second ultrasound receiver. If three ultrasound receivers are now provided according to the present invention, then a second hyperbola is created with the first or second ultrasound receiver and the third ultrasound receiver as the focal points. The intersection of the two hyperbolas uniquely characterizes the position of the ultrasound transmitter, and thus the position of the primary coil.

A display unit, which is developed to display the ascertained position of the vehicle relative to the primary coil of the inductive device, is preferably provided. Using the display, the driver would thus be able to manually position the vehicle so that the primary coil and the secondary coil of the inductive charging device are positioned relative to each other such that the most efficient energy transmission possible is achieved.

In addition, a fourth ultrasound receiver is preferably provided, which is disposed on the vehicle and developed to receive at least one fourth ultrasonic signal sequence in a near range. The first, second, third and fourth ultrasound receivers are situated in such a way that a secondary coil of the inductive charging device disposed on the vehicle is situated, in particular in a centered manner, within the system of the ultrasound receivers. This placement makes it possible for the fourth ultrasound receiver to receive a fourth direct receive signal within the fourth ultrasonic signal sequence in the near range. Alternatively or additionally, the fourth ultrasonic signal sequence may include additional receive signals, which correspond to an indirect transmission of the first ultrasonic signal from at least one ultrasound transmitter to the fourth ultrasound receiver in each case. The processing unit is developed to ascertain the fourth direct receive signal within the fourth ultrasonic signal sequence. It is preferably also provided that a first receiving range of the first ultrasound receiver, a second receiving range of the second ultrasound receiver, a third receiving range of the third ultrasound receiver and a fourth receiving range of the fourth ultrasound receiver are essentially directed toward the secondary coil of the inductive charging device. The sonic lobes of the ultrasound receivers are correspondingly open such that the range of the secondary coil is encompassed by the sonic lobes. In the event that the vehicle is already positioned in such a way that the ultrasound transmitter, and thus the primary coil, is located within the region defined by the four ultrasound receivers, then the described addition of a further, fourth ultrasound receiver results in greater redundancy for the determination of the position of the vehicle relative to the ultrasound transmitter.

The device may preferably also be used for locating a vehicle in the far range. For this purpose, an additional, fifth ultrasound receiver, situated on the vehicle, is preferably provided, which is able to receive a fifth ultrasonic signal sequence with a fifth direct receive signal and further receive signals in the far range. To allow for a localization also in the far range, the first and second ultrasound receivers are furthermore developed to receive the first and/or second ultrasonic signal sequence in the far range as well. The far range thus correspondingly characterizes a range within which a reception of the first ultrasonic signal sequence by the first ultrasound receiver, a reception of the second ultrasonic signal sequence by the second ultrasound receiver, and the reception of a fifth ultrasonic signal sequence by the fifth ultrasound receiver are possible. The processing unit is furthermore developed to ascertain the fifth direct receive signal within the fifth ultrasonic signal sequence and, in addition, to ascertain a position of the vehicle relative to the primary coil of the inductive charging device as a function of the ascertained first, second and fifth direct receive signals. Because of the additional ultrasound receiver, the described placement of the device would thus offer the possibility of locating the vehicle if it is not yet located in the near range of the first ultrasound transmitter, and thus the primary coil of the inductive charging device. Preferably, a fifth receiving range is virtually completely aligned in the forward direction of the vehicle and situated so that it is able to receive a fifth, directly transmitted ultrasonic signal of the first ultrasound transmitter in the far range as well. The sonic lobe of the fifth ultrasound receiver is accordingly open so that the range of the forward direction of the vehicle is encompassed by the sonic lobe. For example, the fifth ultrasound receiver may represent an ultrasound receiver which is installed in the bumper of the vehicle. To allow for an even more reliable locating of the vehicle in the far range relative to the primary coil, it would be possible in this case to provide a further, sixth ultrasound receiver, which is developed to receive a sixth ultrasonic signal sequence featuring a sixth direct receive signal and further receive signals in the far range as well. For this purpose, the sixth receiving range of the sixth ultrasound receiver is preferably likewise aligned in the forward direction.

In addition, a further ultrasound transmitter is provided, which is situated on the primary coil of the inductive charging device and is provided to emit at least one further ultrasonic signal. Each of the at least two ultrasound transmitters outputs an ultrasonic signal in this case. The at least two ultrasound transmitters are situated so that the at least two ultrasonic signals are output in opposite directions. This would be an alternative to only one ultrasound transmitter that is able to emit in at least two different directions that lie opposite each other. In contrast, two ultrasound transmitters would offer the advantage of allowing for a precise alignment of the transmission devices. In order to achieve the largest possible range by the ultrasonic sound waves, it is preferably provided to incline the ultrasound transmitters by an angle of at least 20°. This angle characterizes the angle between the main sensor axis and the surface.

In addition, the present invention provides a method for locating a vehicle for an inductive energy transmission to the vehicle in a near range, which is carried out by a previously described device. In a first method step, at least one ultrasonic signal is emitted with the aid of at least one ultrasound transmitter. In the following method steps, a first ultrasonic signal sequence is received by a first ultrasound receiver, a second ultrasonic signal sequence is received by a second ultrasound receiver, and a third ultrasonic sequence is received by a third ultrasound receiver in the near range. In subsequent method steps, a first direct receive signal is ascertained within the first ultrasonic signal sequence, a second direct receive signal is ascertained within the second ultrasonic signal sequence, and a third direct receive signal is ascertained within the third ultrasonic signal sequence. A position of the vehicle relative to the primary coil of the inductive charging device is then ascertained as a function of the previously ascertained direct receive signals.

Moreover, it is preferably also provided to ascertain the direct receive signals as a function of a respective amplitude of the ultrasonic signals received altogether within the individual ultrasonic signal sequence. Ultrasonic signals that are received directly without a prior reflection are characterized by the in comparison greater amplitudes because they have previously not lost any sound energy through a reflection at objects. As a result, this method step represents a simple possibility of distinguishing direct receive signals from indirect receive signals.

Preferably, it is furthermore provided that the present method may additionally be used for locating the vehicle in the far range. Here, only a first ultrasonic signal sequence is preferably received with the aid of a first ultrasound receiver and a second ultrasonic signal sequence with the aid of a second ultrasound receiver. In this context, use is made of the fact that the amplitude of a received direct receive signal diminishes across the distance of the transmitter from the receiver. This is able to be described by the formula $$A = \frac{1}{r} \times k(r),$$

where r describes the distance from the transmitter to the receiver, A describes the amplitude of the ultrasonic signal, and k(r) describes the decrease due to an atmospheric attenuation. The term k(r) amounts to 0.5-2.0 dB/m for typical environmental conditions. Thus, the distance of the vehicle from the ultrasound transmitter is able to be determined, at least approximately, as a function of the amplitude of the direct receive signal. However, this requires knowledge of the particular sound amplitude of the direct receive signal when the primary coil and the secondary coil are positioned on top of each other. This sound amplitude may be stored as a reference sound amplitude, for example, so that the amplitudes of the received first direct receive signals are able to be compared to the reference sound amplitude, thereby allowing the distance to the ultrasound transmitter to be estimated in approximate terms. This method step, for example, may therefore be used to recheck the position of the vehicle, previously determined via the time difference, relative to the primary coil of the inductive charging device.

BRIEF DESCRIPTION OF THE DRAWINGS

FIG. 2 schematically shows an ultrasonic signal sequence with direct receive signals and further receive signals.

DETAILED DESCRIPTION OF EXAMPLE EMBODIMENTS

Figure 1A:
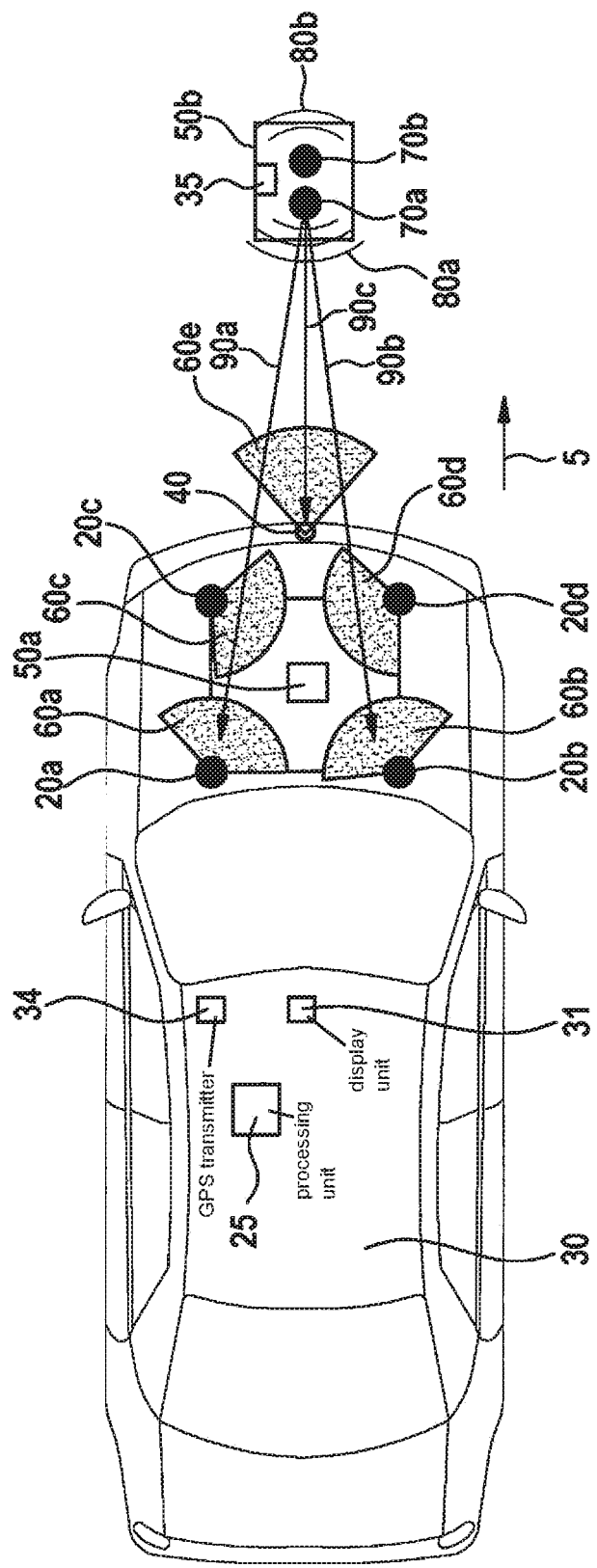
FIG. 1a shows a first specific embodiment of the device for locating a vehicle for an inductive energy transmission from an inductive charging device to the vehicle in the far range.

FIG. 1a shows a plan view of a vehicle 30, which is located in forward direction 5 in front of a primary coil 50b of an inductive charging device. Situated on primary coil 50b are two ultrasound transmitters 70a and 70b, which emit an ultrasonic signal 80a and 80b in opposite directions in each case. A first ultrasound receiver 20a, a second ultrasound receiver 20b, a third ultrasound receiver 20c, and a fourth ultrasound receiver 20d are situated on the underside of vehicle 30 around secondary coil 50a of the inductive charging device in such a way that ultrasound receivers 20a, 20b, 20c and 20d form the corners of a rectangle in each case and the secondary coil is situated within this defined rectangle of the four ultrasound receivers 20a, 20b, 20c and 20d in a centered manner. Each of the four ultrasound receivers 20a, 20b, 20c and 20d has a receiving range 60a, 60b, 60c and 60d, and the first receiving range 60a of first ultrasound receiver 20a and second receiving range 60b of second ultrasound receiver 20b are essentially directed toward forward direction 5. In this illustration, the vehicle is positioned in such a way that the two ultrasound transmitters 70a and 70b, and thus primary coil 50b, are not yet located within the region defined by the placement of four ultrasound receivers 20a, 20b, 20c and 20d. In this position of the vehicle relative to ultrasound transmitters 70a and 70b, only first ultrasound receiver 20a and second ultrasound receiver 20b are able to receive an ultrasonic signal sequence including a first direct receive signal 90a or a second direct receive signal 90b. Third receiving range 60c of third ultrasound receiver 20c and fourth receiving range 60d of fourth ultrasound receiver 20d, on the other hand, are aligned counter to forward direction 5 of vehicle 30 and thus are unable to receive a direct receive signal from the two ultrasound transmitters 70a and 70b in this position of the vehicle relative to ultrasound transmitters 70a and 70b. A situation is therefore shown in which the vehicle is still in the far range. At this distance, third ultrasound receiver 20c and fourth ultrasound receiver 20d are able to receive only ultrasonic signal sequences that include further receive signals that correspond to an indirect transmission of the ultrasonic signal to the third and fourth ultrasound receiver, respectively.

In order to optimize the locating of vehicle 30 for an inductive energy transmission from an inductive charging device to vehicle 30 in the illustrated far range, an additional, fifth ultrasound receiver 40 is situated at the front of vehicle 30, e.g., the bumper. Fifth receiving range 60e allocated to fifth ultrasound receiver 40 is aligned in forward direction 5 of the vehicle so that it is able to receive an ultrasonic signal sequence with a fifth direct receive signal 90c of ultrasound transmitter 70a.

In this first specific embodiment of the device, a processing unit 25 is situated on vehicle 30, which is developed to ascertain the earliest received direct receive signals within the ultrasonic signal sequences and to ascertain a position of vehicle 30 relative to primary coil 50b of the inductive charging device as a function of the ascertained direct receive signals.

In addition, a first GPS transmitter 34 is situated on vehicle 30 and a second GPS transmitter 35 is situated on primary coil 50b. The emitted GPS signals are received by processing unit 25 and compared to one another, so that it may be provided that the two ultrasound transmitters 70a and 70b begin with the transmission of the ultrasonic signals only as a function of a possible receiving radius of the ultrasound receivers. Typically, ultrasound receivers are able to receive ultrasonic signals in a meaningful manner only from a distance starting at 5 to 10 meters.

To determine the distance between the vehicle and the primary coil, an RFID coil may alternatively also be situated on the vehicle, which is decoded by a transmit and receive unit situated on the primary coil. Another such possibility is an ultrasound transmitter which is disposed on the vehicle and emits a code, which in turn is received and decoded by at least one ultrasound receiver situated on the primary coil.

Figure 1B:
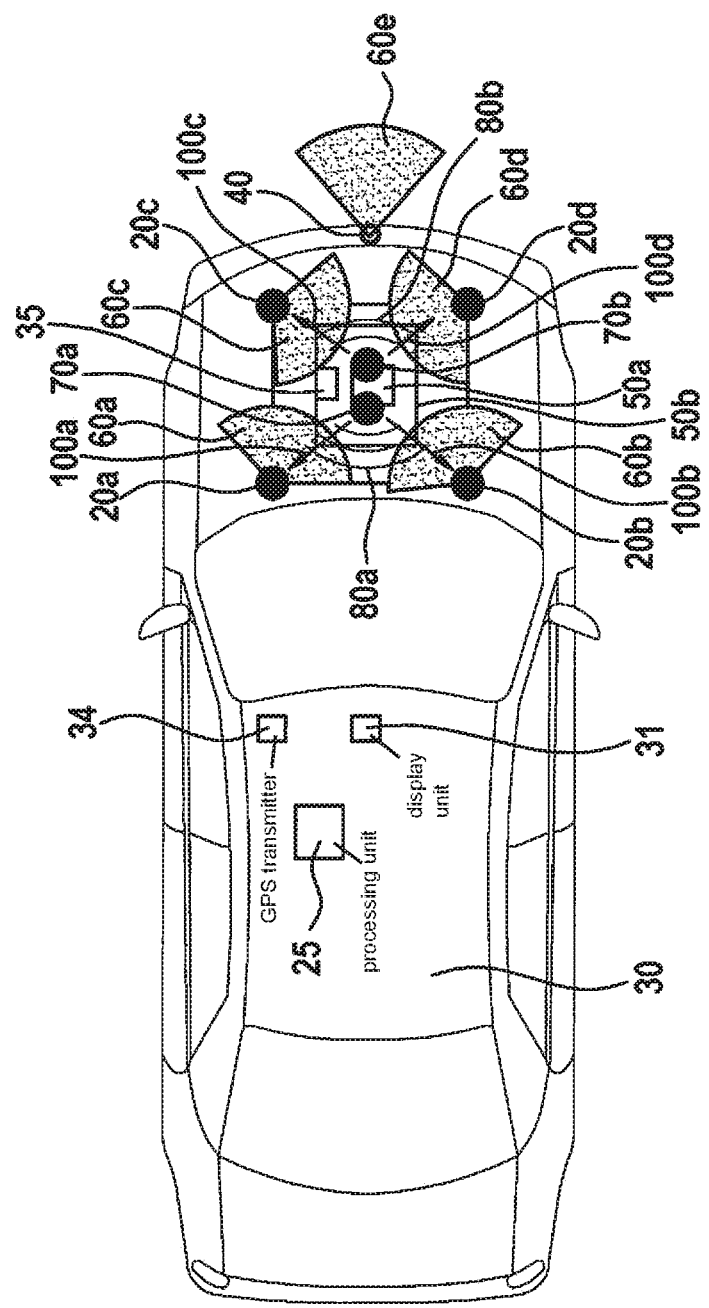
FIG. 1b shows a second specific embodiment of the device for locating a vehicle for an inductive energy transmission from an inductive charging device to the vehicle in the near range.

In contrast to FIG. 1a, FIG. 1b shows a situation in which vehicle 30 is located in the near range and positioned above primary coil 50b in such a way that primary coil 50b as well as secondary coil 50a are placed on top of each other. In the illustrated position of vehicle 30, the best possible energy transmission from the inductive charging device to vehicle 30 is able to take place.

In this near range of secondary coil 50a and primary coil 50b, first ultrasound receiver 20a and second ultrasound receiver 20b receive direct receive signals 100a and 100b from ultrasound transmitter 70a, as was already the case in FIG. 1a. The difference here is that third ultrasound receiver 20c now also receives an ultrasonic signal sequence including a third direct receive signal 100c and fourth ultrasound receiver 20d receives a fourth ultrasonic signal sequence including a fourth direct receive signal 100d. These two direct signals are transmitted by ultrasound transmitter 70b in each case.

By way of example, FIG. 2 shows a first ultrasonic signal sequence 250 in a time-specified first measuring window 255. For example, the amplitude may be plotted on Y-axis 200 of the illustrated diagram, and the time on X-axis 210.

The at least one ultrasound transmitter transmits the first ultrasonic signal in time-specified transmission windows, a first transmission window 240a being followed by a further, second transmission window 240b. The time interval between the transmission windows relative to one another and the length of a transmission window are dependent upon the pulse repeat frequency of the ultrasound transmitter.

In this case, the time-specified first measuring window 255 of the first ultrasound receiver, during which first ultrasonic signal sequence 250 is received, is selected in such a way that first measuring window 255 is approximately twice as long as a transmission window 240a or 240b.

The illustrated first ultrasonic signal sequence 250 includes two first direct receive signals 230a and 230b, which are allocated to a different transmission window 240a or 240b of the ultrasound transmitter in each case. Direct receive signal 230a characterizes the earliest first direct receive signal in terms of time. In addition, first ultrasonic signal sequence 250 includes further receive signals 220, which represent echoes due to a multi-path propagation and reflection at the vehicle. Direct receive signals 230a and 230b differ from the further receive signals by the size of the amplitude because direct receive signals 230a and 230b have the largest amplitude in each case. If the pulse repeat frequency of the one ultrasound transmitter is slow enough, then it may also be assumed that only one direct propagator is received in a transmission window and that it is first detected within the transmission window in terms of time.

Figure 3:
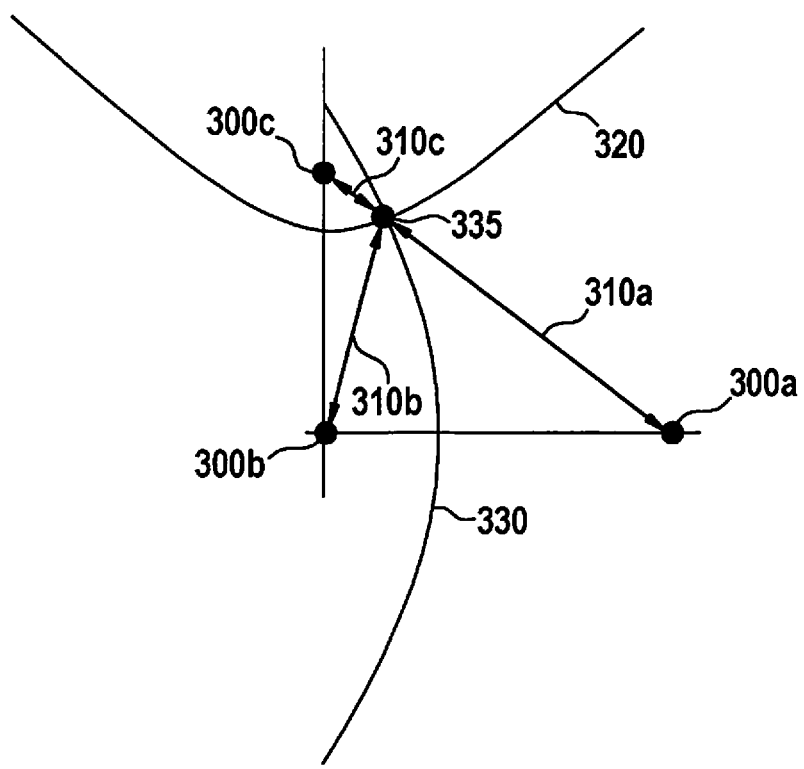
FIG. 3 by way of example, shows the determination of the position of an ultrasound transmitter relative to the vehicle using three ultrasound receivers.

By way of example, FIG. 3 shows a system of three ultrasound receivers 300a, 300b and 300c for the purpose of determining the position of ultrasound receivers 300a, 300b and 300c relative to an ultrasound transmitter 330 as a function of propagation time differences of the ascertained direct receive signals.

In FIG. 3, arrows 310a, 310b and 310c characterize the measured receiving times of the ascertained direct receive signals. In this case, the ultrasound receivers are developed to receive the respective ultrasonic signal sequences in time-specified measuring windows that are synchronized with respect to one another. Because of the desynchronization of the ultrasound transmitter and ultrasound receiver, the arrows do not characterize the propagation times from the ultrasound transmitter to the ultrasound receiver but rather the times at which the signals were received by the ultrasound receivers. Thus, it is only the propagation time differences between the receivers that are correspondingly able to be ascertained. First hyperbola 330 characterizes all points for which the amount of the difference of the distances to first ultrasound receiver 300a and second ultrasound receiver 300b as focal points of first hyperbola 330 are equal. Second hyperbola 320 characterizes all points for which the amount of the difference in the distances to second ultrasound receiver 300b and third ultrasound receiver 300c as the focal points of second hyperbola 320 are equal. Intersection 335 of first hyperbola 330 and second hyperbola 320 uniquely characterizes the location of the ultrasound transmitter relative to the ultrasound receivers. Also possible would be the use of an additional, fourth ultrasound receiver in order to increase the redundancy of the system. The fourth ultrasound receiver, for example, could be positioned so that all ultrasound receivers are situated in the form of a rectangle.

Figure 4:
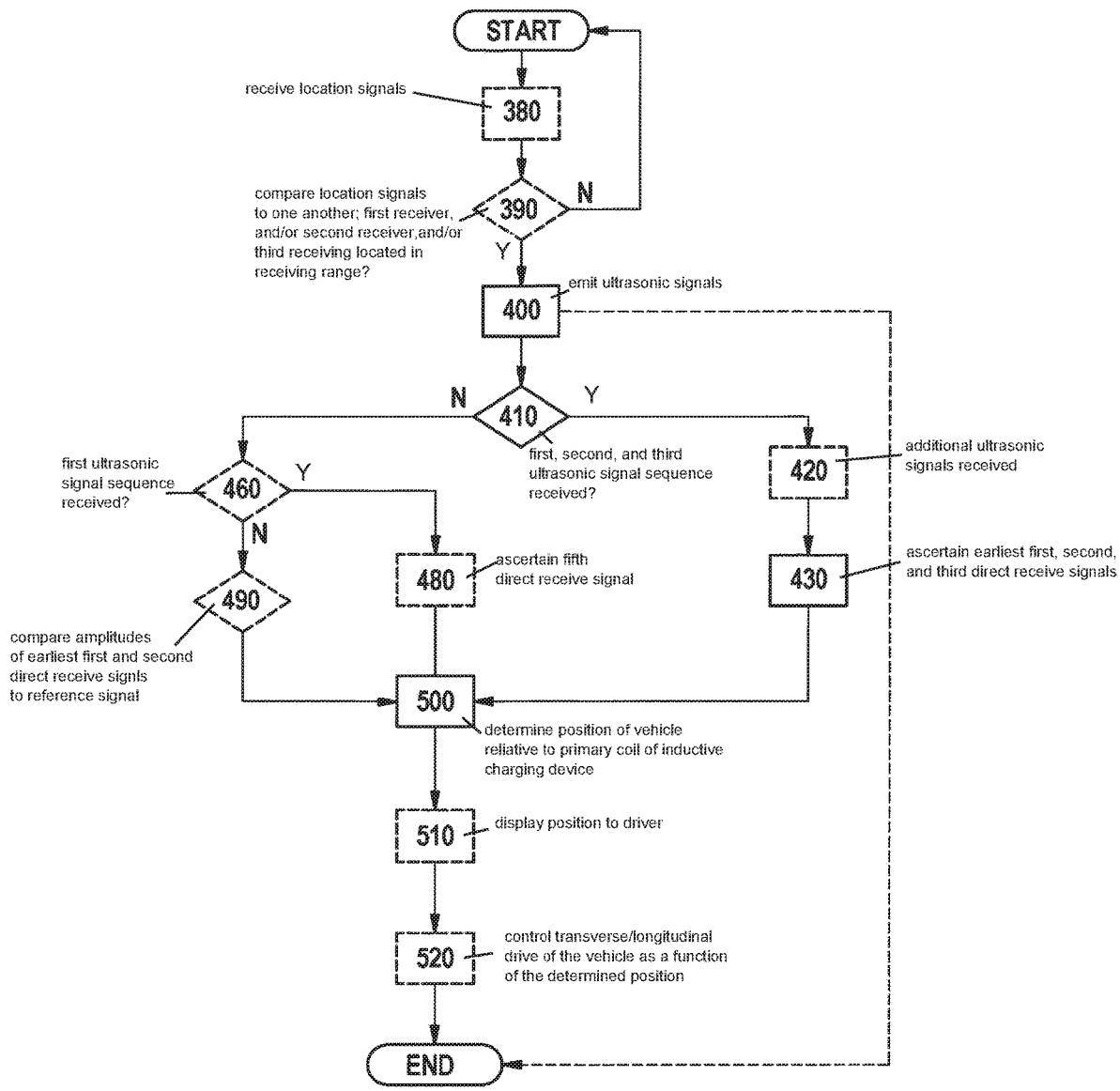
FIG. 4 shows a method sequence for locating a vehicle for an inductive energy transmission to the vehicle.

FIG. 4 shows a method sequence for locating a vehicle for an inductive energy transmission to the vehicle. In a method step 400, a first ultrasonic signal is emitted. In a method step 410 following method step 400, it is checked whether at least one first ultrasonic signal sequence featuring at least one first direct receive signal and further receive signals, a second ultrasonic signal sequence featuring at least one second direct receive signal and further receive signals, and a third ultrasonic signal sequence featuring at least one third direct receive signal and further receive signals were received. The ultrasonic signal sequences may be received simultaneously but also one after the other in a random sequence. If the first, second and third ultrasonic signal sequences are received, then this is an indication that the vehicle is located in the near range, and in a method step 430 following method step 410, the earliest first direct receive signal within the first ultrasonic signal sequence, the earliest second direct receive signal within the second ultrasonic signal sequence and the earliest third direct receive signal within the third ultrasonic signal sequence are ascertained. The earliest direct receive signals are able to be ascertained at the same time but also one by one in a random sequence. In a method step 500 following method step 430, the position of the vehicle relative to the primary coil of the inductive charging device will then be determined as a function of the ascertained direct receive signals.

Optionally, in a method step 380, location signals of the vehicle are able to be received from the primary coil of the inductive charging device at the start of the present method. In a method step 390 following method step 380, these location signals are compared to one another. If it is determined in the process that the first ultrasound receiver and/or the second ultrasound receiver and/or the third ultrasound receiver is/are located in a possible receiving range of the emitted first ultrasonic signal, then the ultrasound transmitter begins to emit ultrasonic signals in method step 400. If it is determined that the vehicle is still located too far from the primary coil for such a purpose, then the method is terminated or alternatively started from the beginning.

Optionally, in a method step 420 following method step 410, additional ultrasonic signal sequences are able to be received. This, e.g., fourth, ultrasonic signal sequence includes at least one fourth and further receive signals. The earliest fourth direct receive signal would then be determined again in following method step 440.

The present method may optionally use the method also for locating the vehicle in the far range. If it is determined in method step 410 that no third ultrasonic signal sequence is able to be received with the aid of the third ultrasound receiver, then it is checked in method step 460 following method step 410 whether a fifth ultrasonic signal sequence is received instead by a fifth ultrasound receiver. If the fifth ultrasonic signal sequence is received, then the fifth direct receive signal within the fifth ultrasonic signal sequence is ascertained in method step 480 following method step 460. In addition, the earliest first direct receive signal within the first ultrasonic signal sequence and the earliest second direct receive signal within the second ultrasonic signal sequence is ascertained. In method step 500, the position of the vehicle relative to the primary coil of the inductive charging device is then ascertained as a function of the ascertained first, second and third direct receive signal. If it is determined in method step 460 that no fifth ultrasonic signal sequence is able to be received with the aid of the fifth ultrasound receiver, then the amplitudes of the ascertained earliest first and second direct receive signals are compared to an associated reference amplitude in following method step 490. It is exploited in this context that the amplitude of a received direct receive signal decreases across the distance of the transmitter from the receiver. For example, usable as a reference amplitude may be the amplitude of the direct receive signal when the primary coil and the secondary coil are situated on top of each other. In method step 500 following method step 490, the position of the vehicle is determined as a function of the amplitude comparison.

Moreover, in a method step 510 following method step 500, the position of the vehicle relative to the primary coil may optionally be displayed to the driver of the vehicle, e.g., on a screen.

In addition, in a method step 520 following method step 510, the transverse and/or longitudinal drive of the vehicle is/are optionally able to be controlled as a function of the ascertained position of the vehicle relative to the primary coil of the inductive charging device with the aid of the processing unit.

What is claimed is:

1. A device for locating a vehicle for an inductive energy transmission from an inductive charging device to the vehicle in a near range, the device comprising:
    at least one ultrasound transmitter which is situated on a primary coil of the inductive charging device and configured to emit at least one ultrasonic signal; and
    a first ultrasound receiver situated on the vehicle and configured to receive at least one first ultrasonic signal sequence in the near range, the first ultrasonic signal sequence including at least two first direct receive signals which correspond to a direct transmission of the at least one ultrasonic signal from the at least one ultrasound transmitter to the first ultrasound receiver, and additional receive signals which correspond to an indirect transmission of the ultrasonic signal from the at least one first ultrasound transmitter to the first ultrasound receiver;
    a second ultrasound receiver situated on the vehicle and configured to receive at least one second ultrasonic signal sequence in the near range, the second ultrasonic signal sequence including at least two second direct receive signals which correspond to a direct transmission of the ultrasonic signal from the at least one ultrasound transmitter to the second ultrasound receiver, and additional receive signals, which correspond to an indirect transmission of the ultrasonic signal from the at least one ultrasound transmitter to the second ultrasound receiver;
    a third ultrasound receiver disposed on the vehicle and configured to receive at least one third ultrasonic signal sequence in the near range, the third ultrasonic signal sequence including at least two third direct receive signals which correspond to a direct transmission of the ultrasonic signal from the at least one ultrasound transmitter to the third ultrasound receiver, and additional receive signals which correspond to an indirect transmission of the ultrasonic signal from the at least one ultrasound transmitter to the third ultrasound receiver;
    a processing unit configured to ascertain an earliest first direct receive signal within the first ultrasonic signal sequence, to ascertain an earliest second direct receive signal within the second ultrasonic signal sequence, to ascertain an earliest third direct receive signal within the third ultrasonic signal sequence, and to ascertain a position of the vehicle relative to the primary coil of the inductive charging device in the near range as a function of the ascertained earliest first direct receive signal, the ascertained earliest second direct receive signal, and the ascertained earliest third direct receive signal,
    wherein the at least one ultrasound transmitter is configured to emit the at least one ultrasonic signal in a time-specified first transmission window, the first ultrasound receiver is configured to receive the first ultrasonic signal sequence in a time-specified first measuring window, the second ultrasound receiver is configured to receive the second ultrasonic signal sequence in a time-specified second measuring window, and the third ultrasound receiver is configured to receive the third ultrasonic signal sequence in a time-specified third measuring window, and wherein the first measuring window, second measuring window and time-specified third measuring window are each longer than the first transmission window.

2. The device as recited in claim 1, wherein the first measuring window, the second measuring window and the time-specified third measuring window are each at least twice as long as the first transmission window.

3. The device as recited in claim 1, wherein the ultrasound receivers are configured to receive the first ultrasonic signal sequence, the second ultrasonic signal sequence, and the third ultrasonic signal sequence in mutually synchronized, time-specified measuring windows, and the processing unit is configured to ascertain the position of the vehicle relative to the primary coil of the inductive charging device as a function of propagation time differences of the ascertained direct receive signals relative to one another.

4. The device as recited in claim 1, further comprising:
    a display unit configured to display the ascertained position of the vehicle relative to the primary coil of the inductive device.

5. The device as recited in claim 1, further comprising:
    a fourth ultrasound receiver disposed on the vehicle and configured to receive at least one fourth ultrasonic signal sequence in the near range, the fourth ultrasonic signal sequence including at least one fourth direct receive signal which corresponds to a direct transmission of the ultrasonic signal from the at least one ultrasound transmitter to the fourth ultrasound receiver, and additional receive signals which correspond to an indirect transmission of the ultrasonic signal from the at least one ultrasound transmitter to the fourth ultrasound receiver, wherein the processing unit is configured to ascertain the fourth direct receive signal within the fourth ultrasonic signal sequence, and wherein the first ultrasound receiver, the second ultrasound receiver, the third ultrasound receiver, and the fourth ultrasound receiver are situated in such a way that a secondary coil of the inductive charging device disposed on the vehicle is situated in a centered manner within a system of the first ultrasound receiver, the second ultrasound receiver, the third ultrasound receiver, and the fourth ultrasound receiver.

6. The device as recited in claim 1, wherein the at least one ultrasound transmitter includes at least two ultrasound transmitters situated on the primary coil of the inductive charging device, each of the at least two ultrasound transmitters configured to emit a respective ultrasonic signals, the at least two ultrasound transmitters being situated so the respective ultrasonic signals are emitted in opposite directions from one another.

7. The device as recited in claim 5, wherein:
a first receiving range is allocated to the first ultrasound receiver,
a second receiving range is allocated to the second ultrasound receiver,
a third receiving range is allocated to the third ultrasound receiver,
a fourth receiving range is allocated to the fourth ultrasound receiver, and
the first receiving range, the second receiving range, the third receiving range and the fourth receiving range are directed toward the secondary coil of the inductive charging device.

8. The device as recited in claim 7, wherein for an additional locating of the vehicle in the near range, the device includes a fifth ultrasound receiver situated on the vehicle and configured to receive at least one fifth ultrasonic signal sequence in a far range, the fifth ultrasonic signal sequence including at least one fifth direct receive signal which corresponds to a direct transmission of the at least one ultrasonic signal from the at least one ultrasound transmitter to the fifth ultrasound receiver, and additional receive signals, which correspond to an indirect transmission of the at least one ultrasonic signal from the at least one ultrasound transmitter to the fifth ultrasound receiver, and
wherein:
the first ultrasound receiver is configured to receive the first ultrasonic signal sequence in the far range,
the second ultrasound receiver is developed to receive the second ultrasonic signal sequence in the far range,
the processing unit is configured to ascertain the fifth direct receive signal within the fifth ultrasonic signal sequence, and to ascertain a position of the vehicle relative to the primary coil of the inductive charging device in the far range as a function of the ascertained fifth direct receive signal.

9. The device as recited in claim 8, wherein a fifth receiving range is allocated to the fifth ultrasound receiver, which is essentially directed toward a forward direction of the vehicle.

10. The device as recited in claim 1, wherein the processing unit is configured to control a transverse drive and/or a longitudinal drive of the vehicle as a function of the ascertained position of the vehicle relative to the primary coil of the inductive charging device.

11. A method for locating a vehicle for an inductive energy transmission to the vehicle in a near range, the method comprising the following steps:
emitting at least one ultrasonic signal using at least one ultrasound transmitter situated on a primary coil of an inductive charging device;
receiving at least one first ultrasonic signal sequence, which includes at least two first direct receive signals that correspond to a direct transmission of the at least one ultrasonic signal from the at least one ultrasound transmitter to a first ultrasound receiver, and further receive signals, which correspond to an indirect transmission of the at least one ultrasonic signal from the at least one ultrasound transmitter to the first ultrasound receiver, using a first ultrasound receiver situated on the vehicle, in the near range;
receiving at least one second ultrasonic signal sequence, which includes at least two second direct receive signals which correspond to a direct transmission of the at least one ultrasonic signal from the at least one ultrasound transmitter to a second ultrasound receiver, and further receive signals, which correspond to an indirect transmission of the at least one ultrasonic signal from the at least one ultrasound transmitter to the second ultrasound receiver using a second ultrasound receiver situated on the vehicle, in the near range;
receiving at least one third ultrasonic signal sequence which includes at least two third direct receive signals that correspond to a direct transmission of the at least one ultrasonic signal from the at least one ultrasound transmitter to a third ultrasound receiver, and further receive signals, which correspond to an indirect transmission of the at least one ultrasonic signal from the at least one ultrasound transmitter to the third ultrasound receiver, using a third ultrasound receiver, situated on the vehicle, in the near range;
ascertaining an earliest first direct receive signal within the first ultrasonic signal sequence;
ascertaining an earliest second direct receive signal within the second ultrasonic signal sequence;
ascertaining an earliest third direct receive signal within the third ultrasonic signal sequence; and
ascertaining a position of the vehicle relative to the primary coil of the inductive charging device in the near range as a function of the ascertained earliest first direct receive signal, the ascertained earliest second direct receive signal, and the ascertained earliest third direct receive signal,
wherein the at least one ultrasound transmitter is configured to emit the at least one ultrasonic signal in a time-specified first transmission window, the first ultrasound receiver is configured to receive the first ultrasonic signal sequence in a time-specified first measuring window, the second ultrasound receiver is configured to receive the second ultrasonic signal sequence in a time-specified second measuring window, and the third ultrasound receiver is configured to receive the third ultrasonic signal sequence in a time-specified third measuring window, and wherein the first measuring window, second measuring window and time-specified third measuring window are each longer than the first transmission window.

12. The method as recited in claim 11, further comprising the following steps:
receiving the at least one the first ultrasonic signal sequence using the first ultrasound receiver situated on the vehicle in a far range;
receiving the at least one second ultrasonic signal sequence using the second ultrasound receiver situated on the vehicle in the far range; and
ascertaining the position of the vehicle relative to the primary coil of the inductive charging device in the far range as a function of amplitudes of the ascertained earliest first direct receive signals, the ascertained earliest second direct receive signal, the earliest third direct receive signal.

\* \* \* \* \*